United States Patent
Bianchini, Jr.

(10) Patent No.: US 6,842,422 B1
(45) Date of Patent: Jan. 11, 2005

(54) DATA STRIPING BASED SWITCHING SYSTEM

(75) Inventor: Ronald P. Bianchini, Jr., Pittsburgh, PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/333,450

(22) Filed: Jun. 15, 1999

(51) Int. Cl.[7] .............................................. H04Q 11/00
(52) U.S. Cl. ....................... 370/216; 370/372; 711/114; 714/6
(58) Field of Search ................................ 370/216, 217, 370/218, 219, 220, 366, 367, 369, 387, 388, 372, 225, 226, 227, 228, 229; 348/192, 387.1, 575; 714/4, 5, 6, 7, 776; 725/87, 91, 92, 93, 94, 114, 115, 116; 710/124; 711/114

(56) References Cited

U.S. PATENT DOCUMENTS

| | | | | |
|---|---|---|---|---|
| 3,832,492 A | * | 8/1974 | Charransol et al. | 370/372 |
| 3,930,124 A | * | 12/1975 | Lutz | 370/372 |
| 4,737,951 A | * | 4/1988 | Kruger et al. | 370/217 |
| 5,282,209 A | * | 1/1994 | Bonnerot | 714/821 |
| 5,301,297 A | * | 4/1994 | Menon et al. | 711/114 |
| 5,418,925 A | * | 5/1995 | DeMoss et al. | 711/114 |
| 5,572,661 A | | 11/1996 | Jacobson | |
| 5,600,631 A | * | 2/1997 | Takatori et al. | 370/217 |
| 5,651,133 A | | 7/1997 | Burkes et al. | |
| 5,659,704 A | | 8/1997 | Burkes et al. | |
| 5,664,187 A | | 9/1997 | Burkes et al. | |
| 5,666,512 A | | 9/1997 | Nelson et al. | |
| 5,696,934 A | | 12/1997 | Jacobson et al. | |
| 5,712,976 A | * | 1/1998 | Falcon et al. | 725/115 |
| 5,727,181 A | | 3/1998 | Beglin et al. | |
| 5,748,885 A | | 5/1998 | Gallagher | |
| 5,778,426 A | | 7/1998 | DeKoning et al. | |
| 5,787,242 A | | 7/1998 | DeKoning et al. | |
| 5,790,773 A | | 8/1998 | DeKoning et al. | |
| 5,860,091 A | | 1/1999 | DeKoning et al. | |
| 5,862,312 A | * | 1/1999 | Mann et al. | 714/6 |
| 5,867,736 A | | 2/1999 | Jantz | |
| 5,875,457 A | | 2/1999 | Shalit | |
| 5,996,089 A | * | 11/1999 | Mann et al. | 714/6 |
| 6,339,677 B1 | * | 1/2002 | Kihara | 386/125 |
| 6,404,975 B1 | * | 6/2002 | Bopardikar et al. | 386/46 |
| 6,463,063 B1 | * | 10/2002 | Bianchini et al. | 370/395.53 |

OTHER PUBLICATIONS

Argon Networks, Inc. web site, http://www.argonnetworks.com/product/gpn/switching.htm, 1997–1998.

* cited by examiner

Primary Examiner—Chi Pham
Assistant Examiner—Keith M. George
(74) Attorney, Agent, or Firm—Ansel M. Schwartz

(57) ABSTRACT

A switching system for a data stream utilizing striping with a parity stripe, so if a fabric of the system fails, the data stream can still be reconstructed with the parity stripe. The system uses receive and transmit interfaces which implement space division, and fabrics which implement hybrid space/time division.

11 Claims, 2 Drawing Sheets

DATA STRIPING BASED SWITCHING SYSTEM

FIELD OF THE INVENTION

The present invention is related to a switching system which uses stripes of data from a data stream to implement a switching system receives to switch the data stream. More specifically, the present invention is related to a switching system which uses stripes of data from a data stream that the switching system receives to switch the data stream. A parity stripe can be used such that less than all of the stripes are required to reconstruct the data stream if one of the stripes is lost.

BACKGROUND OF THE INVENTION

Time division multiplexing (TDM) is one technique used to implement a switching system. A TDM switch consists of a central resource that operates at a bandwidth equal to the sum of the input and output port bandwidths. The central resource is partitioned via time slots that are allocated to the input and output ports. Typically, the central resource is a memory bus that writes packets that are received on the input ports and reads packets to be transmitted on the output ports. Although practical for small to medium sized switching systems, a TDM switch is limited in throughput by the bandwidth of the centralized memory bus. To scale beyond the bandwidth limitations of a single memory bus, multiple memories are used to implement individual queues. Although greater scaling is permitted with separate queues, performance usually suffers. Globally shared queues yield better performance since all of the switch queue resources can be dynamically allocated to data transients that would otherwise overload individual resources.

Consider a switch fabric with N input ports that each receive packets at rate R and N output ports that each transmit packets at rate R, as shown in FIG. 1. For a shared memory TDM switching system, a single memory bus is required that has an aggregate bandwidth of 2×N×R. The arriving packets are aggregated and written to the memory. Once written to memory, the packets are read out of the memory and transmitted on the output ports.

This system operates correctly and in a non-blocking fashion provided that the shared memory has enough bandwidth to service all of the input and output ports. Memory bandwidth can be increased by increasing the speed and width of the memory bus.

Data striping is effectively used in RAID (redundant array of inexpensive disks) video servers to reduce the BW and capacity requirements of disk drives when generating a high BW, high capacity video stream. In RAID-0 (RAID, level 0), a data stream is striped across several disk drives. In FIG. 2, a video stream is "striped" across three disk drives. The video server reads the striped information off of all three disks, reconstructs the video stream and outputs a single, high BW video stream. In the example system, the drive BW capacity is required to be one third of the video stream BW capacity.

In RAID-3 (RAID, level 3) a bit-wise parity data stripe is added to reconstruct data when a single disk fails. In the example in FIG. 3, the video stream is striped across three disks and a parity stripe is stored on a fourth disk. Consider a failure of drive 2 (the same argument is true for a failure of any one of the drives). The server reads the remaining data stripes with the parity stripe and reconstructs the missing data.

In the present invention, a centralized TDM switching system can be implemented with several memory banks, with all memory banks operating in concert. The total switch throughput is not limited by the bandwidth of a single memory bank, but by the total number of memory banks that can be interconnected in a switch. Even though multiple distinct memory banks are used, data is queued in a centralized and globally shared model. Data striping is used to implement a single global memory model across several banks. Data striping has been used effectively in RAID (redundant array of inexpensive disk) servers to reduce the bandwidth requirements on any single disk drive in the server. This invention applies the concepts of data striping to network switching systems.

SUMMARY OF THE INVENTION

The present invention pertains to a switching system. The system comprises M receive interfaces each of which receive a data stream, where M is greater than or equal to 1 and is an integer. At least a first receive interface of the M receive interfaces produces S stripes of the data stream, where S is greater than or equal to 2 and is an integer. The system comprises N switch fabrics, where N is greater than or equal to 2 and is an integer. At least a first and second of the N switch fabrics each receive 1 of the N stripes of the data stream from the first of the M receive interfaces. Each switch fabric is connected to at least one of the M receive interfaces. The system comprises O transmit interfaces, where O is greater than or equal to 1 and is an integer. At least a first of the O transmit interfaces reconstructs the data stream from the stripes of the data stream received by the first and second of the N switch fabrics. Each transmit interface is connected to at least 2 of the N switch fabrics.

The present invention pertains to a switching system. The system comprises M receive interfaces each of which receive data streams, where M is greater than or equal to 2 and is an integer, and produce N data stripes, where N is greater than or equal to 2 and is an integer. The system comprises N switch fabrics each of which receive the N data stripes from the M receive interfaces. The system comprises M transmit interfaces, each of which receive the N data stripes and reconstruct them into the respective data streams.

The present invention pertains to a method for switching. The method comprises the steps of receiving a data stream at a receive interface. Then there is the step of striping the data stream into N stripes, where N is greater than or equal to 2 and is an integer, with the receive interface. Next there is the step of providing the N stripes to N switch fabrics. Then there is the step of transmitting the N stripes to a transmit interface which reconstructs the data stream from the stripes and transmits non-stripe data on its output ports.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
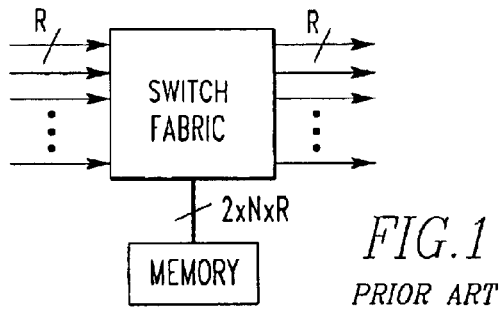
FIG. 1 is a schematic representation of a prior art TDM switching system.
Figure 2:
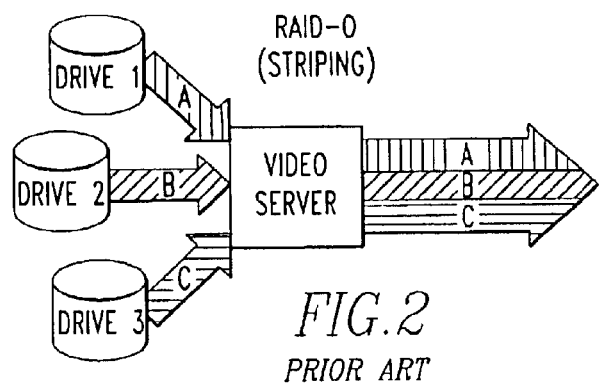
FIG. 2 is a schematic representation of a prior art RAID video.
Figure 3:
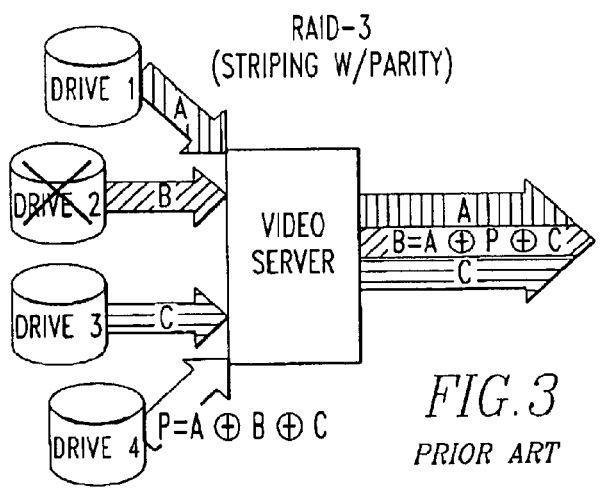
FIG. 3 is a schematic representation of a prior art RAID server with a failed drive.
Figure 4:
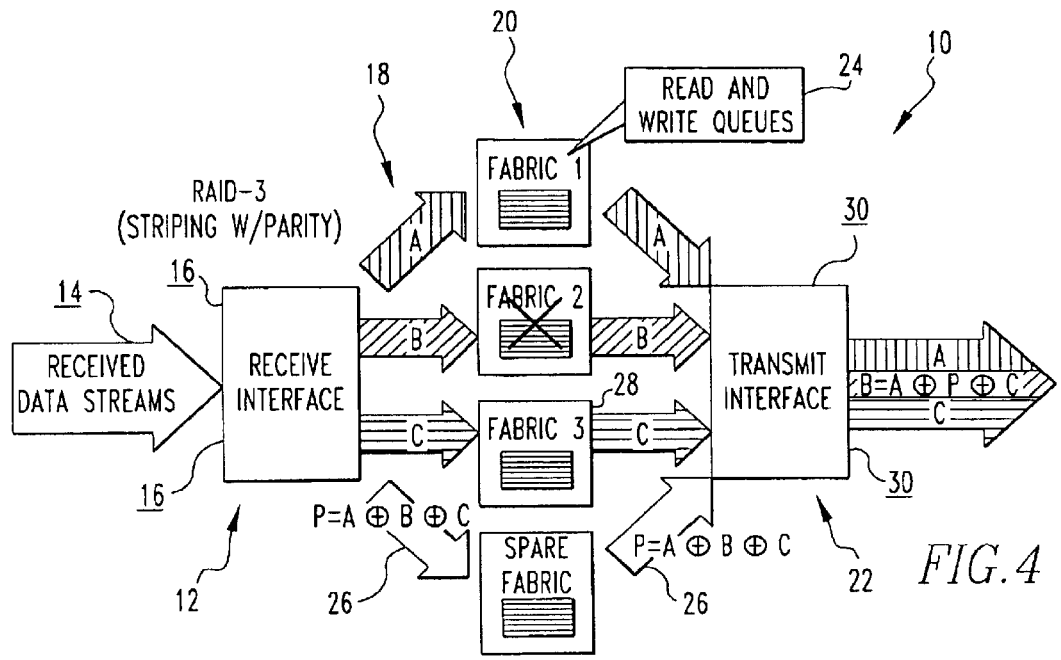
FIG. 4 is a schematic representation of a switching system of the present invention.
Figure 5:
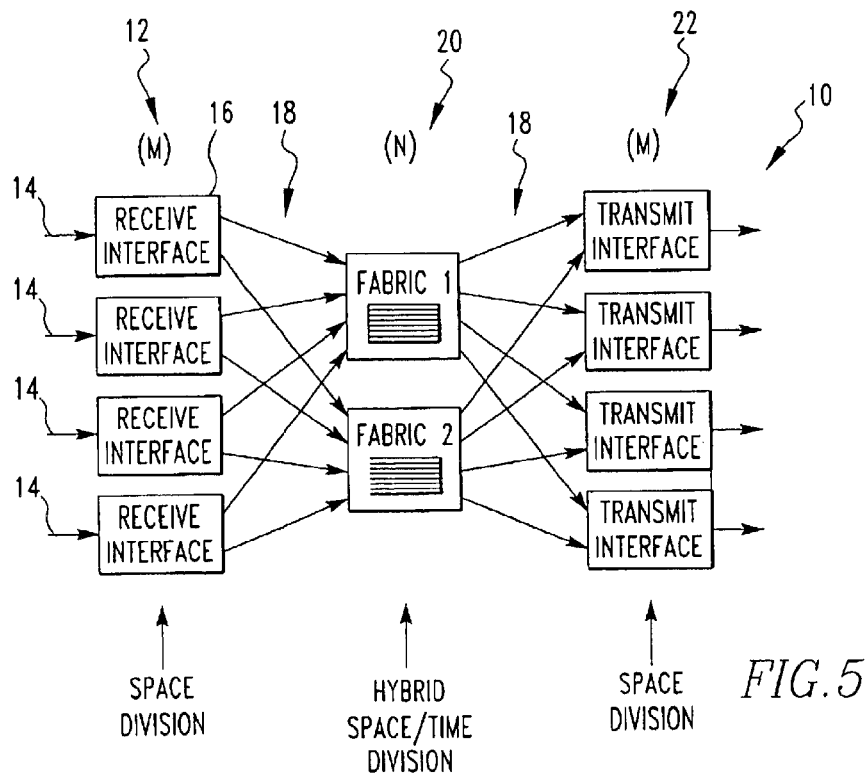
FIG. 5 is a schematic representation of a switching system of the present invention when M=4 and N=2.

Referring now to the drawings wherein like reference numerals refer to similar or identical parts throughout the several views, and more specifically to FIGS. 4 and 5 thereof, there is shown a switching system 10. The system 10 comprises M receive interfaces 12 each of which receive a data stream 14, where M is greater than or equal to 1 and is an integer. At least a first receive interface 16 of the M receive interfaces 12 produces S stripes 18 of the data stream 14, where S is greater than or equal to 2 and is an integer. The system 10 comprises N switch fabrics 20, where N is greater than or equal to 2 and is an integer. At least a first and second of the N switch fabrics 20 each receive 1 of the N stripes 18 of the data stream 14 from the first of the M receive interfaces 12. Each switch fabric is connected to at least one of the M receive interfaces 12. The system 10 comprises O transmit interfaces 22, where O is greater than or equal to 1 and is an integer. At least a first of the O transmit interfaces 22 reconstructing the data stream 14 from the stripes 18 of the data stream 14 received by the first and second of the N switch fabrics 20. Each transmit interface is connected to at least 2 of the N switch fabrics 20.

Preferably, O=M and S equals N. The M receive interfaces 12 are preferably connected to the N switch fabrics 20 and produce N stripes 18 which are provided to the N switch fabrics 20, respectively. Each of the M receive interfaces 12 are connected to each of the N switch fabrics 20. Preferably, each of the O transmit interfaces 22 are connected with each of the N switch fabrics 20 and receive the N stripes 18 from the N switch fabrics 20 and reconstruct the respective data streams 14.

There are preferably N*M stripes 18 provided between each of the receive interfaces 12 and the switch fabrics 20, and each of the switch fabrics 20 and the transmit interfaces 22. Preferably, each fabric has M read and write queues 24 associated with each receive interface and transmit interface. The first receive interface 16 preferably produces a parity stripe 26, and including a third switch fabric 28 which receives the parity stripe 26. The third switch fabric 28 is connected to the first receive interface 16 so if 1 of the N switch fabrics 20 fail, the data stream 14 can still be reconstructed with the parity stripe 26 on the first transmit interface 30.

The present invention pertains to a switching system 10. The system 10 comprises M receive interfaces 12 each of which receive data streams 14, where M is greater than or equal to 2 and is an integer, and produce N data stripes 18, where N is greater than or equal to 2 and is an integer. The system 10 comprises N switch fabrics 20 each of which receive the N data stripes 18 from the M receive interfaces 12. The system 10 comprises M transmit interfaces 22, each of which receive the N data stripes 18 and reconstruct them into the respective data streams 14.

Preferably, each of the interfaces produces N stripes 18 from each data stream 14 such that any X stripes 18 of the N stripes 18, where X is less than or equal to N and is an integer, can reconstruct the data stream 14 from which the X stripes 18 arose. Preferably, N stripes 18=X stripes 18 plus 1 stripe. The 1 stripe is preferably a parity stripe 26.

The present invention pertains to a method for switching. The method comprises the steps of receiving a data stream 14 at a receive interface. Then there is the step of striping the data stream 14 into N stripes 18, where N is greater than or equal to 2 and is an integer, with the receive interface. Next there is the step of providing the N stripes 18 to N switch fabrics 20. Then there is the step of transmitting the N stripes 18 to a transmit interface which reconstructs the data stream 14 from the stripes 18 and transmits non-stripe data on its output ports.

Preferably, the striping step includes the steps of striping a parity stripe 26, providing the parity stripe 26 to a switch fabric, and transmitting the parity stripe 26 to the transmit interface so if any one of the other N switch fabrics 20 fail, the data stream 14 can still be reconstructed with the parity stripe 26.

The striping step preferably includes the step of producing N stripes 18 from each data stream 14 such that any X stripes 18 of the N stripes 18, where X is less than or equal to N and is an integer, can reconstruct the data stream 14 from which the X stripes 18 arose.

In the operation of the invention, data striping is extended to network switch architectures by striping incoming data across multiple fabrics in a switch. A fabric is constructed from a central TDM resource. This effectively reduces the memory bandwidth needed on any single fabric to be a fraction of the total bandwidth of the switch. RAID-3 is used to implement N+1 redundancy across the fabrics. Incoming data is striped across the available fabrics by the receive interfaces 12, including a parity stripe 26 that contains the bit-wise parity of the data stripes 18. If any one fabric fails, the data can be reconstructed on the transmit interface, as shown in FIG. 4. Fabric redundancy is hit-less. When a fabric fails, all of the data that was stored in the fabric at the time of the failure is reconstructed using the parity stripe 26.

To correctly implement a switching system 10 using data striping, the RAID server model is insufficient. A RAID server still contains a centralized resource (the server) that must operate at the aggregate data rate. The server stripes 18 all of the data that is to be written to the disk drives and reconstructs the data that is read from the disks. The RAID server implements a 1:N redundancy model: 1 server stripes 18 all of the data for the N disk drives. To remove the bottleneck associated with the server, an M:N redundancy model is used in this invention. Each of M network interfaces receive non-striped data from several input ports. The M network interfaces stripe their receive data across the N switch fabrics 20. The switch fabrics 20 receive the striped data, queue the data and transmit the striped data to the M transmit interfaces 22. The transmit interfaces 22 reconstruct the data and transmit non-striped data on their output ports.

The cost of implementing an M:N redundancy scheme is the number of queues that each fabric must implement. In a RAID server, with a single server, each disk drive effectively implements single read and write queues 24 for the server. Using M:N redundancy, each fabric effectively implements M read and write queues 24, one for each network interface. The cost of implementing multiple queues on the fabrics is low as compared to implementing faster TDM busses (for a non-striped solution). Queues typically require a read and write pointer into the shared memory space.

An example switching system 10 is given in FIG. 5 with M=4 network interfaces and N=2; striped fabrics. Assume that each receive interface is connected to one input port that operates at 1 Gbps. A total of 4 Gbps arrive at the switch. The receive interface directs ½ Gbps of the received stream to each switch fabric. Each fabric implements 4 input queues that operate at ½ Gbps and thus receives a total of 2 Gbps of input data. Each fabric also implements 4 output queues of data at ½ Gbps to the transmit interfaces 22. Each transmit interface receives two ½ Gbps data streams 14, reconstructs the data and transmits on a 1 Gbps output port. Even though the entire switch implements a centrally queued 4 Gbps TDM switching system 10, the fastest that any one fabric operates in this example is 2 Gbps. In general, if the switch capacity is C, and N fabrics are used, then each fabric operates at C/N bandwidth.

The data striping and M:N redundancy models implement a global time division multiplexing switching system 10. The receive and transmit interfaces 22 implement space division, since data is received on and transmitted to one of several unique ports. The distributed fabrics implement a hybrid space/time division system 10. Striping causes space division, as different parts of the data streams 14 are queued on different fabrics. Once data arrives at a fabric, the fabric implements time division multiplexing. A suggested method for implementing a switching system 10 is to construct a fabric with as high a bandwidth time division bus as possible. If greater bandwidth is required in the switching system 10, then implement data striping across several fabrics to implement a hybrid space/time division switching system 10 as presented in this invention.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switching system comprising:

M receive interfaces each of which receive a data stream, where M is greater than or equal to 1 and is an integer, each receive interface implementing space division, at least a first receive interface of the M receive interfaces produces N stripes of the data stream, where N is greater than or equal to 2 and is an integer;

N switch fabrics, each of which implement hybrid space/time division, each fabric implementing space division on the stripes the fabric receives and time division multiplexing on the data that arrives at the fabric, at least a first and second of the N switch fabrics each receive 1 of the N stripes of the data stream from the first of the M receive interfaces, each switch fabric connected to at least one of the M receive interfaces; and O transmit interfaces, where O is greater than or equal to 1 and is an integer, each transmit interface implementing space division, at least a first of the O transmit interfaces reconstructing the data stream from the stripes of the data stream received by the first and second of the N switch fabrics, each transmit interface connected to at least 2 of the N switch fabrics, the M receive interfaces are connected to the N switch fabrics and produce N stripes which are provided to the N switch fabrics, respectively, each of the M receive interfaces connected to each of the N switch fabrics, each of the O transmit interfaces are connected with each of the N switch fabrics and receive the N stripes from the N switch fabrics and reconstruct the respective data streams, there are N*M stripes provided between each of the receive interfaces and the switch fabrics, and each of the switch fabrics and the transmit interfaces, each fabric has M read and write queues associated with each receive interface and transmit interface, the first receive interface produces a parity stripe, and including an additional switch fabric (N+1) which receives the parity stripe, said additional switch fabric connected to the first receive interface so if 1 of the N+1 switch fabrics fail, the data stream can still be reconstructed with the parity stripe on the first transmit interface.

2. A system as described in claim 1 wherein O=M.

3. A switching system operating at capacity N comprising:

M receive interfaces each of which receive data streams, where M is greater than or equal to 2 and is an integer, each receive interface implementing space division, at least a first receive interface of the M receive interfaces produces S stripes and a parity stripe of a data stream the first receive interface receives, where S is greater than or equal to 3 and is an integer;

N distributed switch fabrics, each of which implement hybrid space/time division, each fabric implementing space division on the stripes the fabric receives and time division multiplexing on the data that arrives at the fabric, where N is greater than or equal to 3 and is an integer, at least a first, second and third of the N switch fabrics each receive 1 of the S stripes of the data stream from the first of the M receive interfaces, each switch fabric connected to at least one of the M receive interfaces, each switch fabric operating at C/N bandwidth;

O transmit interfaces, where O is greater than or equal to 2 and is an integer, each transmit interface implementing space division, at least a first of the O transmit interfaces reconstructing the data stream from the S stripes of the data stream received by the first and second of the N switch fabrics, each transmit interface connected to the N switch fabrics; and an additional switch fabric (N+1) which receives the parity stripe, said third switch fabric connected to the first receive interface so if 1 of the N+1 switch fabrics fail, the data stream can still be reconstructed with the parity stripe on the first transmit interface.

4. A system as described in claim 3 wherein O=M and S equals N.

5. A system as described in claim 4 wherein the M receive interfaces are connected to the N switch fabrics and produce N stripes which are provided to the N switch fabrics, respectively, each of the M receive interfaces connected to each of the N switch fabrics.

6. A system as described in claim 5 wherein each of the O transmit interfaces are connected with each of the N switch fabrics and receive the N stripes from the N switch fabrics and reconstruct the respective data streams.

7. A system as described in claim 6 wherein there are N*M stripes provided between each of the receive interfaces and the switch fabrics, and each of the switch fabrics and the transmit interfaces.

8. A system as described in claim 7 wherein each fabric has M read and write queues associated with each receive interface and transmit interface.

9. A system as described in claim 8 wherein the distributed switch fabrics implement hybrid space/time division and the transmit and receive interfaces implement space division.

10. A method for switching comprising the steps of:

receiving a data stream at a receive interface implementing space division;

striping the data stream into N stripes, where N is greater than or equal to 3 and is an integer, with the receive interface;

striping a parity stripe;

providing the N stripes to N switch fabrics implementing hybrid space/time division;

providing the parity stripe to an NH switch fabric;

transmitting the N stripes to a transmit interface implementing space division which reconstructs the data stream from the stripes and transmits non-stripe data on its output ports; and transmitting the parity stripe to the transmit interface so if any one of the other N switch fabrics fail, the data stream can still be reconstructed with the parity stripe.

11. A method as described in claim 10 wherein the striping step includes the step of producing N stripes from each data stream such that any X stripes of the N stripes, where X is less than or equal to N and is an integer, can reconstruct the data stream from which the X stripes arose.

* * * * *